(12) United States Patent  (10) Patent No.: US 8,480,106 B1
Cohen  (45) Date of Patent: Jul. 9, 2013

(54) DUAL SUSPENSION SYSTEM

(75) Inventor: Shai S. Cohen, Alexandria, VA (US)

(73) Assignee: The George Washington University, Washington, DC (US)

( * ) Notice: Subject to any disclaimer, the term of this patent is extended or adjusted under 35 U.S.C. 154(b) by 191 days.

(21) Appl. No.: 12/841,521

(22) Filed: Jul. 22, 2010

Related U.S. Application Data

(60) Provisional application No. 61/228,034, filed on Jul. 23, 2009.

(51) Int. Cl.
*B60G 17/005* (2006.01)
*B60G 5/00* (2006.01)
*B60G 9/00* (2006.01)

(52) U.S. Cl.
CPC ............... *B60G 17/005* (2013.01); *B60G 5/00* (2013.01); *B60G 9/00* (2013.01)
USPC .......... 280/124.125; 280/124.134; 280/5.502; 180/256; 701/37

(58) Field of Classification Search
CPC .................................................. B60G 17/005
USPC .................... 280/124.125, 124.134, 124.135, 280/124.156, 124.106, 124.116, 5.502, 124.103, 280/124.111, 5.507, 5.508, 5.509, 5.513; 180/256, 292, 359; 701/37, 38; 267/188, 267/189
See application file for complete search history.

(56) References Cited

U.S. PATENT DOCUMENTS

| | | | |
|---|---|---|---|
| 2,852,269 A | 9/1958 | Gaines et al. | |
| 3,155,186 A | 11/1964 | Cadmus et al. | |
| 3,157,238 A | 11/1964 | Kraemer et al. | |
| 3,162,262 A | 12/1964 | Ordorica et al. | |
| 3,239,235 A | 3/1966 | Kozicki | |
| 3,246,716 A | 4/1966 | Kozicki | |
| 3,279,556 A | 10/1966 | Kozicki | |
| 3,356,176 A | 12/1967 | Herr | |
| 3,785,672 A | 1/1974 | Shakespear | |
| 3,948,337 A | 4/1976 | Richardson et al. | |
| 3,999,779 A | 12/1976 | Bishop | |
| 4,029,337 A | 6/1977 | Bishop | |

(Continued)

FOREIGN PATENT DOCUMENTS

WO  WO-9515865 A1  6/1995
WO  WO-9956987 A2  11/1999

(Continued)

OTHER PUBLICATIONS

Car Bibles: The Car Suspension Bible, last updated Sep. 16, 2007, 44 pgs., Copyright Chris Longhurst 1994-2007 dated Aug. 30, 2008 from www.archive.org.

*Primary Examiner* — Eric Culbreth
*Assistant Examiner* — Karen Beck
(74) *Attorney, Agent, or Firm* — Blank Rome LLP

(57) ABSTRACT

A dual suspension system includes a chassis, a suspension arm rotatably connected to the chassis, a wheel connection connected coupled to the suspension arm, a first lock connected to the chassis and the suspension arm, and a second lock connected between a differential housing and the chassis. The first and second locks each have an unlocked state and a locked state. When the first lock is unlocked, and the second lock is locked, the vehicle substantially provides independent suspension. When the first lock is locked, and the second lock is unlocked, the vehicle substantially provides solid axle suspension.

15 Claims, 21 Drawing Sheets

U.S. PATENT DOCUMENTS

| | | | |
|---|---|---|---|
| 4,143,887 A | 3/1979 | Williams et al. | |
| 4,282,949 A | 8/1981 | Kopich et al. | |
| 4,373,743 A | 2/1983 | Parsons, Jr. | |
| 4,400,007 A | 8/1983 | Ingalls | |
| 4,484,767 A | 11/1984 | Klem | |
| 4,550,926 A | 11/1985 | MacIsaac | |
| 4,573,702 A | 3/1986 | Klem | |
| 4,674,589 A | 6/1987 | Szymkowiak | |
| 4,842,298 A | 6/1989 | Jarvis | |
| 4,911,081 A | 3/1990 | Meret | |
| 4,974,863 A * | 12/1990 | Patin | 280/62 |
| 5,000,476 A | 3/1991 | Lindorfer et al. | |
| 5,166,306 A | 11/1992 | Petri | |
| 5,445,236 A | 8/1995 | Kuhn | |
| 5,611,555 A * | 3/1997 | Vidal | 280/282 |
| 5,620,199 A | 4/1997 | Lee | |
| 5,636,857 A | 6/1997 | Tandy, Jr. et al. | |
| 5,845,918 A | 12/1998 | Grinde et al. | |
| 5,884,925 A | 3/1999 | Wong | |
| 5,887,880 A | 3/1999 | Mullican et al. | |
| 6,068,276 A | 5/2000 | Kallstrom | |
| 6,109,631 A | 8/2000 | Jones et al. | |
| 6,122,948 A | 9/2000 | Moses | |
| 6,173,978 B1 | 1/2001 | Wagner | |
| 6,250,663 B1 * | 6/2001 | Maloy | 280/492 |
| 6,305,487 B1 | 10/2001 | Montague | |
| 6,349,952 B1 | 2/2002 | Kallstrom | |
| 6,364,333 B1 | 4/2002 | Atkinson | |
| 6,416,044 B1 | 7/2002 | Warinner et al. | |
| 6,418,363 B2 | 7/2002 | Cochofel et al. | |
| 6,519,517 B1 | 2/2003 | Heyring et al. | |
| 6,550,797 B2 | 4/2003 | Wagner | |
| 6,675,926 B2 | 1/2004 | Montague | |
| 6,676,144 B2 | 1/2004 | Wagner et al. | |
| 6,761,371 B1 | 7/2004 | Heyring et al. | |
| 6,945,541 B2 | 9/2005 | Brown | |
| 6,945,547 B2 | 9/2005 | Ackley et al. | |
| 6,976,553 B1 | 12/2005 | Dahl et al. | |
| 7,029,014 B2 * | 4/2006 | Hamm | 280/5.502 |
| 7,107,746 B2 | 9/2006 | Melone et al. | |
| 7,185,903 B2 | 3/2007 | Dove | |
| 7,343,997 B1 * | 3/2008 | Matthies | 180/215 |
| 7,384,054 B2 | 6/2008 | Heyring et al. | |
| 7,392,997 B2 | 7/2008 | Sanville et al. | |
| 7,401,870 B2 | 7/2008 | Tseng et al. | |
| 7,407,173 B2 | 8/2008 | Walker | |
| 7,445,070 B1 | 11/2008 | Pickering | |
| 7,487,985 B1 * | 2/2009 | Mighell | 280/124.103 |
| 7,631,721 B2 * | 12/2009 | Hobbs | 180/348 |
| 7,665,749 B2 * | 2/2010 | Wilcox | 280/124.103 |
| 7,722,063 B2 * | 5/2010 | Dieziger | 280/124.103 |
| 7,967,306 B2 * | 6/2011 | Mighell | 280/124.103 |
| 8,070,172 B1 * | 12/2011 | Smith et al. | 280/124.103 |
| 2001/0005803 A1 | 6/2001 | Cochofel et al. | |
| 2001/0035623 A1 | 11/2001 | Wagner | |
| 2001/0052435 A1 | 12/2001 | Montague | |
| 2002/0063011 A1 | 5/2002 | Montague | |
| 2002/0096852 A1 | 7/2002 | Wagner | |
| 2002/0125674 A1 | 9/2002 | Walker | |
| 2002/0149235 A1 | 10/2002 | Alderson | |
| 2003/0067135 A1 | 4/2003 | Wagner et al. | |
| 2003/0090080 A1 | 5/2003 | Trotter et al. | |
| 2003/0116935 A1 | 6/2003 | Zadok | |
| 2003/0205880 A1 | 11/2003 | Walker | |
| 2004/0046349 A1 | 3/2004 | Ackley et al. | |
| 2004/0046350 A1 | 3/2004 | Wagner et al. | |
| 2005/0001401 A1 | 1/2005 | Heyring et al. | |
| 2005/0093260 A1 | 5/2005 | Trescott | |
| 2005/0098964 A1 | 5/2005 | Brown | |
| 2005/0139409 A1 | 6/2005 | Bogue | |
| 2005/0144923 A1 | 7/2005 | Melone et al. | |
| 2005/0184475 A1 * | 8/2005 | Hamm | 280/5.502 |
| 2005/0184476 A1 * | 8/2005 | Hamm | 280/5.502 |
| 2005/0206234 A1 | 9/2005 | Tseng et al. | |
| 2005/0258614 A1 | 11/2005 | Dove | |
| 2006/0017256 A1 | 1/2006 | Hupperich | |
| 2006/0071441 A1 | 4/2006 | Mathis | |
| 2006/0091635 A1 | 5/2006 | Cook | |
| 2006/0175785 A1 * | 8/2006 | Hamm | 280/124.106 |
| 2006/0273540 A1 | 12/2006 | Heron et al. | |
| 2007/0257463 A1 | 11/2007 | Sanville et al. | |
| 2007/0262548 A1 * | 11/2007 | Rawlinson | 280/124.103 |
| 2007/0267837 A1 | 11/2007 | Sanville | |
| 2007/0267838 A1 | 11/2007 | Sanville et al. | |
| 2007/0267839 A1 | 11/2007 | Furman et al. | |
| 2007/0273121 A1 | 11/2007 | Sanville et al. | |
| 2008/0042393 A1 | 2/2008 | Humphreys | |
| 2008/0066974 A1 | 3/2008 | Pearlman et al. | |
| 2008/0067772 A1 | 3/2008 | Weagle | |
| 2008/0067774 A1 | 3/2008 | Sanville et al. | |
| 2008/0073868 A1 | 3/2008 | Weagle | |
| 2008/0100018 A1 | 5/2008 | Dieziger | |
| 2008/0197597 A1 * | 8/2008 | Moulene et al. | 280/124.103 |
| 2008/0238005 A1 * | 10/2008 | James | 280/5.509 |
| 2008/0269987 A1 * | 10/2008 | Barron et al. | 701/38 |
| 2008/0307914 A1 | 12/2008 | Trapp | |
| 2008/0309031 A1 | 12/2008 | Hall et al. | |
| 2009/0020973 A1 | 1/2009 | Richardson | |
| 2011/0148052 A1 * | 6/2011 | Quemere et al. | 280/6.15 |
| 2012/0098225 A1 * | 4/2012 | Lucas | 280/124.103 |

FOREIGN PATENT DOCUMENTS

| | | |
|---|---|---|
| WO | WO-0009913 A2 | 2/2000 |
| WO | WO-2000016998 A1 | 3/2000 |
| WO | WO-2000061394 A1 | 10/2000 |
| WO | WO-2001054932 A1 | 8/2001 |
| WO | WO-2002094590 A2 | 11/2002 |
| WO | WO-2003057517 A1 | 7/2003 |
| WO | WO-2005039901 A1 | 5/2005 |
| WO | WO-2005082068 A2 | 9/2005 |
| WO | WO-2007149442 A2 | 12/2007 |
| WO | WO-2008027277 A2 | 3/2008 |
| WO | WO-2008097635 A2 | 8/2008 |
| WO | WO-2008097647 A2 | 8/2008 |
| WO | WO-2009011810 A1 | 1/2009 |

* cited by examiner

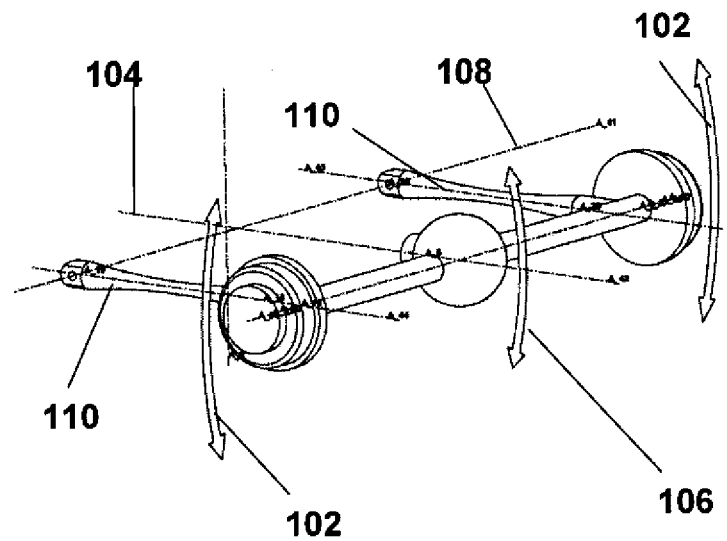
FIG. 1 – PRIOR ART
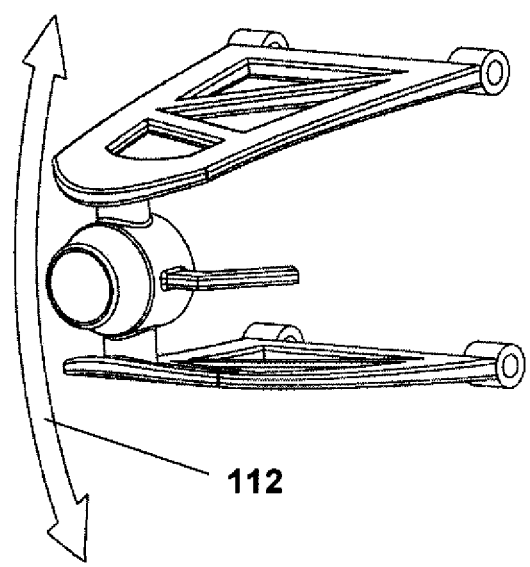
FIG. 2 – PRIOR ART

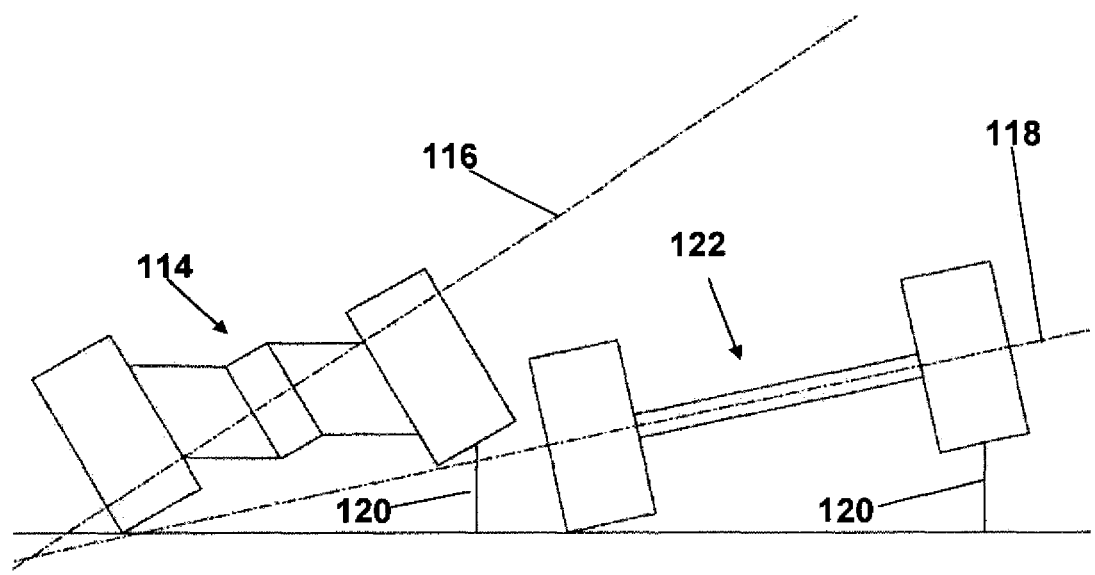
FIG. 3 – PRIOR ART
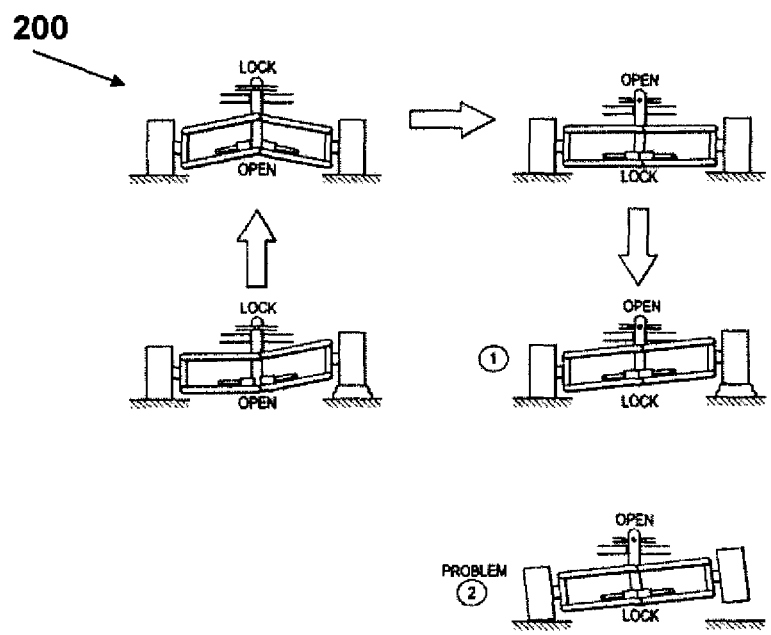
FIG. 4

202

DUAL SUSPENSION SYSTEM

FIELD OF THE INVENTION

The present invention relates to a suspension system for an automobile. In particular, the present invention relates to a suspension system that provides both solid axle suspension and independent suspension for an automobile.

BACKGROUND OF THE INVENTION

Automobiles generally have one of two types of suspension systems: solid axle suspension or independent suspension. In a solid axle suspension system, opposing wheels of the automobile are mechanically linked to each other with a solid connection (shaft, beam, etc). Shock absorbers and links connect the solid shaft to the chassis of the automobile. In an independent suspension system, each wheel is individually connected to the chassis with its own shock absorbers and links.

Referring to FIG. 1, a solid axle suspension system is shown. The suspension has one clear characteristic where the left and right wheels are connected by one rigid element. When the wheels in the suspension are not powered (motor, engine, etc), as in the case of a two wheel drive vehicle with these being the non-powered wheels, the connecting element is usually an I-shaped beam. The suspension may be referred to as Beam axle. When the wheels in the suspension are powered (motor, engine, etc), the connecting element is usually a hollow tube housing a drive shaft with a differential located somewhere along the shaft. Some of the powered solid axles do not include the differential on the axle as in the de Dion tube, and some do not have a differential at all, as in many all-terrain vehicles (ATVs).

Solid axle suspension systems have several benefits, including: simple construction and manufacturing; can be very strong, and therefore used mainly in industrial vehicles and off-road vehicles; camber control during cornering; and has two degrees of freedom, one is the roll 102 about a longitudinal axis 104 or any other longitudinal axis of the vehicle. The second degree of freedom is the roll 106 about the lateral axis 108. In some solid axle systems, the connecting links 110 are in the form of a four-bar mechanism and the axis of rotation 108 is made much farther forward, which enables the wheels to travel almost straight up and down. Solid axles also have the advantage that forces and displacements are transferred from one wheel to the other because of the solid connection between them. Given these advantages, the vehicle possesses ground articulation capabilities that are hard to match by other suspension systems, and is particularly useful in specialty vehicles such as rock crawlers.

On the other hand, solid axle suspensions systems have a number of drawbacks. The systems are heavy; transfer the forces and displacements from one wheel to the other because of the solid connection between them; bump steer can be a problem; requires a large space to accommodate the size of the suspension; and lateral control is a problem in some cases. However, ride quality is probably the biggest issue with solid axles. Because of the large size and weight, the suspension is hard to move (conservation of momentum). And once it is moving, it is very hard to stop. At speed, on uneven terrain, it feels like going through bumps instead of going over them, and once the bump is long gone, the vehicle is still rocking up and down. This not only effects the ride quality, but the general limits of the capabilities of the entire vehicle such as slower safe top speeds and cornering.

Referring to FIG. 2, an independent suspension system is shown. An independent suspension system has one clear characteristic, which is that the left and right wheels are not directly connected to each other. There are many kinds of independent suspensions, such as: Double A-arm, McPherson Strut, Multi link, Trailing arm, etc. The wheels in the suspension maybe powered or not.

Independent suspension systems have several advantages, including: small size; light; can be very adjustable as far as camber, camber gain, caster, toe-in/out, and positioning of roll center; can have very good lateral control and no flexing such as in double A-arm; and each wheel can react to a given excitation independently from the other. Given these advantages, an independent suspension can react quickly to a bump in the road and quickly recover, which will keep the wheels of the vehicle on the ground and not constantly jumping up and down as in the solid axle suspension, especially at higher speeds. This makes the vehicle perform better since it is not losing energy while the wheels are spinning in the air. The chassis can remain fairly parallel to the ground and ride quality is gained. Cornering can be improved with the right adjustments, and so the overall performance is enhanced.

On the other hand, independent suspensions also have several drawbacks, including: only one degree of freedom 112 per wheel; the wheels are independent of one another and may be oblivious to one another; and in some cases where camber gain is designed into the suspension, the wheels will not stay parallel to each other under high loads, such as when the vehicle is carrying a large weight, tows a heavy load, which in turn causes a loss in traction. Given these disadvantages, an independent suspension will perform poorly on a vehicle that requires high loading capabilities or requires the ability to scale large obstacles.

A primary distinction between the independent suspension 114 and the solid axle suspension 122 is illustrated in FIG. 3, where a vehicle is shown passing an obstacle 120. The vehicle with an independent suspension 114 can be driven to a large body roll 116 in comparison to the roll 118 in a similar vehicle passing a similar obstacle 120 with a solid axle suspension 122. That is because the independent suspension does not have any control over the deflection of the suspension other than the spring-damper system, whereas in the solid axle suspension 122 the left and right wheels help control one another by being rigidly connected to one another.

Thus, other than the mechanical differences, the two types of suspension systems provide the automobiles with different capabilities in tackling difficult terrain. Referring to FIGS. 1-3, the solid axle suspension system 122 is preferred when driving over rocks or other large obstacles. Also, the solid axle suspension 122 is better equipped to articulate rocky terrain since it possesses more degrees of freedom per wheel than an independent suspension 114. The wheels are directly connected to one another and react to one another.

When driving on sand dunes, gravel roads, and other similar terrain, independent suspension systems are preferred. Because each wheel is individually and independently linked to the chassis, each wheel is better able to maintain contact with an uneven and ever-changing terrain. Accordingly, independent suspension systems 114 provide the automobile with a better ability to trace the curvature of the road. Also, independent suspension systems 114 can maintain the chassis generally parallel to the surface. Another big advantage of an independent suspension 114 over a solid axle suspension 122 is that the unsprung weight of the vehicle (wheels, brakes, suspension links, shocks and dampers) is much lower. Solid axle suspensions 122 also carry with them the differential and the solid bar between the wheels, which in most cases adds a few hundred pounds to the total weight of the suspension. This makes the solid axle harder to move, and harder to stop from moving (i.e., the larger the mass, the higher the momentum).

However, there is no suspension system that provides both the advantages of a solid axle suspension system 122 and an independent suspension system 114. An independent suspension automobile traveling over sand dunes, and gravel roads might encounter rocks or other obstacles that require a solid axle suspension articulation, and not be able to continue its journey. Thus, there is a need in the art for such a suspension system that provides both modes of suspension on the same vehicle, namely both solid axle suspension and independent suspension.

SUMMARY OF THE INVENTION

Accordingly, it is a primary object of the present invention to provide a suspension system that selectively provides solid axle suspension and independent suspension for an automobile. It is another object of the invention to provide a vehicle which has the advantages of both a solid axle suspension and an independent suspension. It is a further object of the invention to provide a vehicle with both a solid axle suspension and an independent suspension. It is yet another object of the invention to provide a vehicle with both a solid axle suspension and an independent suspension, and a manner of switching between the solid axle suspension and the independent suspension.

In accordance with the present invention and this specific embodiment, a dual suspension system is provided which includes a chassis. The dual suspension system operates in an independent suspension mode and a solid axle suspension mode. In the independent suspension operating mode, the system has two (left and right) unequal length A-arm four-bar mechanisms. In the solid axle operating mode, the system uses a five-bar spatial mechanism.

The independent suspension mechanism includes the chassis, a differential housing, two lower A-arms (one on each side), two upper A-arms (one on each side), two hub carriers (one on each side), two angled arms (one on each side), two first locks (one on each side), and a second lock. The solid axle suspension mechanism includes all of the independent suspension parts, along with one center arm.

The dual suspension system has two sets of locks which enable the system to be selectively operated between the independent suspension mode and the solid axle suspension mode. A first set of locks (one lock on the left side of the vehicle, and one on the right side) is provided to lock the independent suspension in a horizontal position, and a second lock is provided to lock the center of the suspension (the differential housing) to the chassis. When both of the first locks are unlocked, and the second locks are locked, the suspension is in the independent suspension mode. When both of the first locks are locked, and the second locks are unlocked, the suspension is in the solid axle suspension mode.

Other objects, advantages and salient features of the invention will become apparent from the following detailed description, which, taken in conjunction with the annexed drawings, discloses an embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a perspective view of one type of a conventional solid axle suspension system;

FIG. 2 is a perspective view of one type of a conventional independent suspension system;

FIG. 3 is a side-by-side comparison of a conventional independent suspension and a conventional solid axle suspension while trying to negotiate a similar obstacle;

FIG. 4 is a front view of a dual suspension system according to an exemplary embodiment of the invention;

FIGS. 18(*a*) and 18(*b*) are perspective views of a dual suspension system shown in

FIG. 5;

DETAILED DESCRIPTION OF THE INVENTION

Referring to FIGS. 4-36, the present invention is a dual suspension system that provides selectable solid axle suspension and independent suspension for a vehicle. For purposes of illustration without intending to limit the invention, the suspension system 200 is shown and described with reference to an embodiment where the vehicle has four wheels. However, in other embodiments, the suspension system 200 can include less than four wheels or more than four wheels. Thus, the invention is not intended to be limited to embodiments with only four wheels. The suspension system 200 is shown and described with reference to an embodiment where the suspension includes a differential in a differential housing.

However, in other embodiments, the suspension system 200 can include a suspension without a differential but still some sort of structure to act as the center part between left and right sides of the suspension. However, the suspension center need not be in the center of the suspension, but can be a support point located elsewhere on the suspension. Thus, the invention is not intended to be limited to embodiments with a differential.

Figure 5:
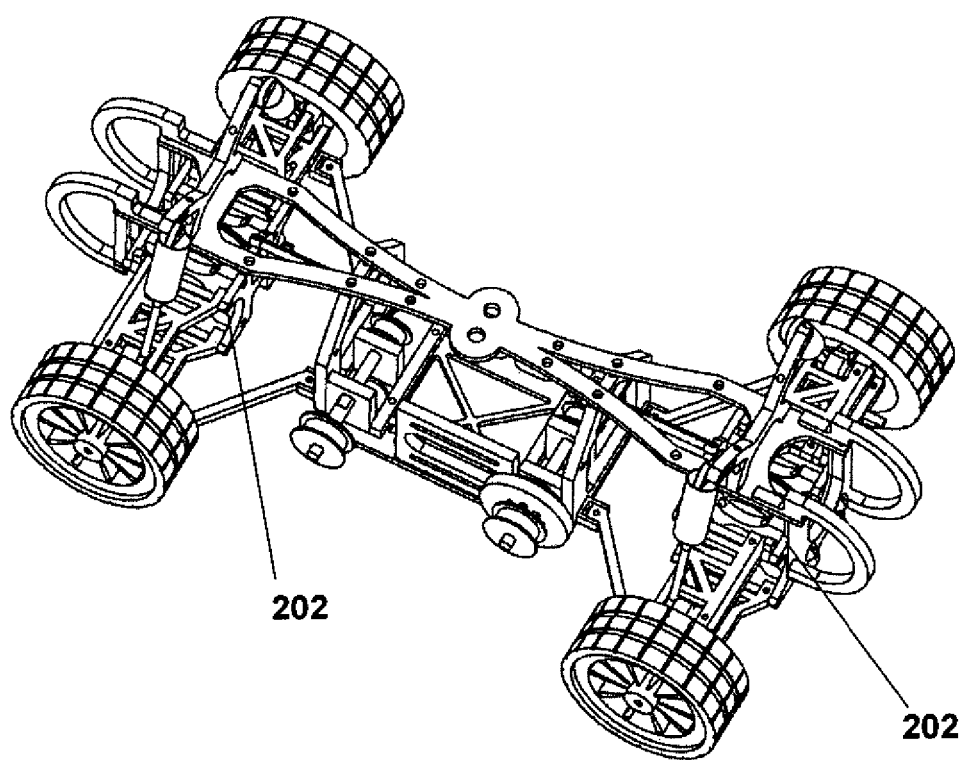
FIG. 5 is a perspective view of an exemplary embodiment of the dual suspension system installed at both the front and the rear of the vehicle in accordance with a preferred embodiment of the invention.
Figure 6:
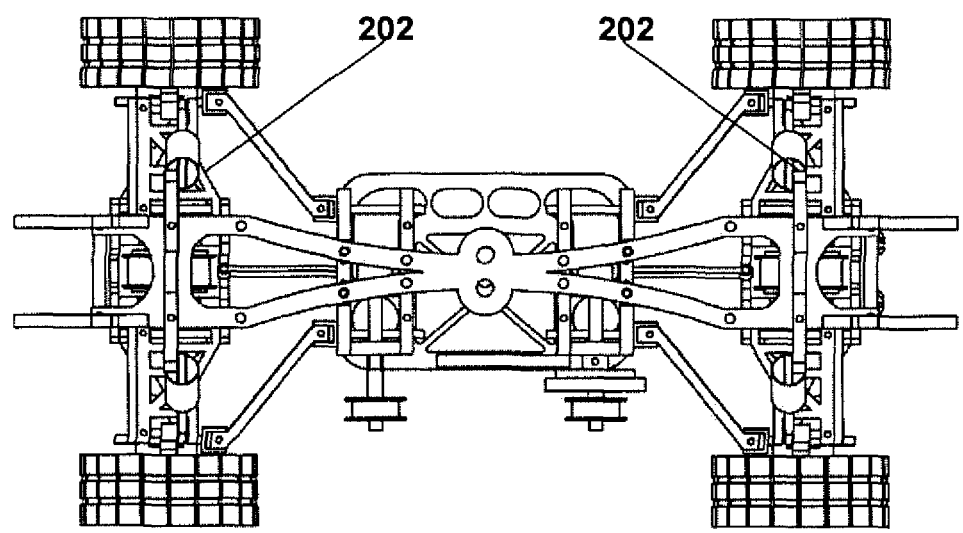
FIG. 6 is a top view of the dual suspension system shown in FIG. 5.
Figure 7:
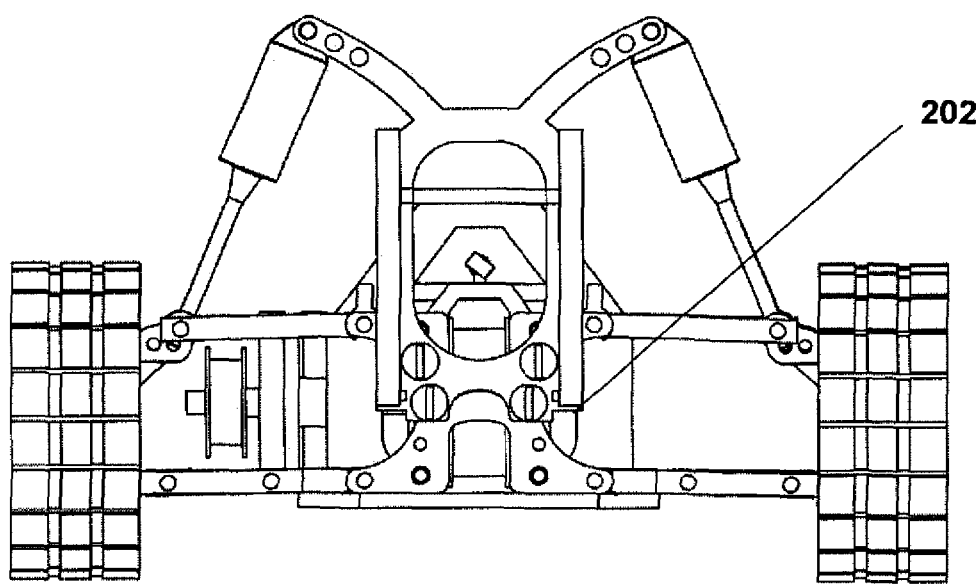
FIG. 7 is a front view the dual suspension system shown in FIG. 5.
Figure 8:
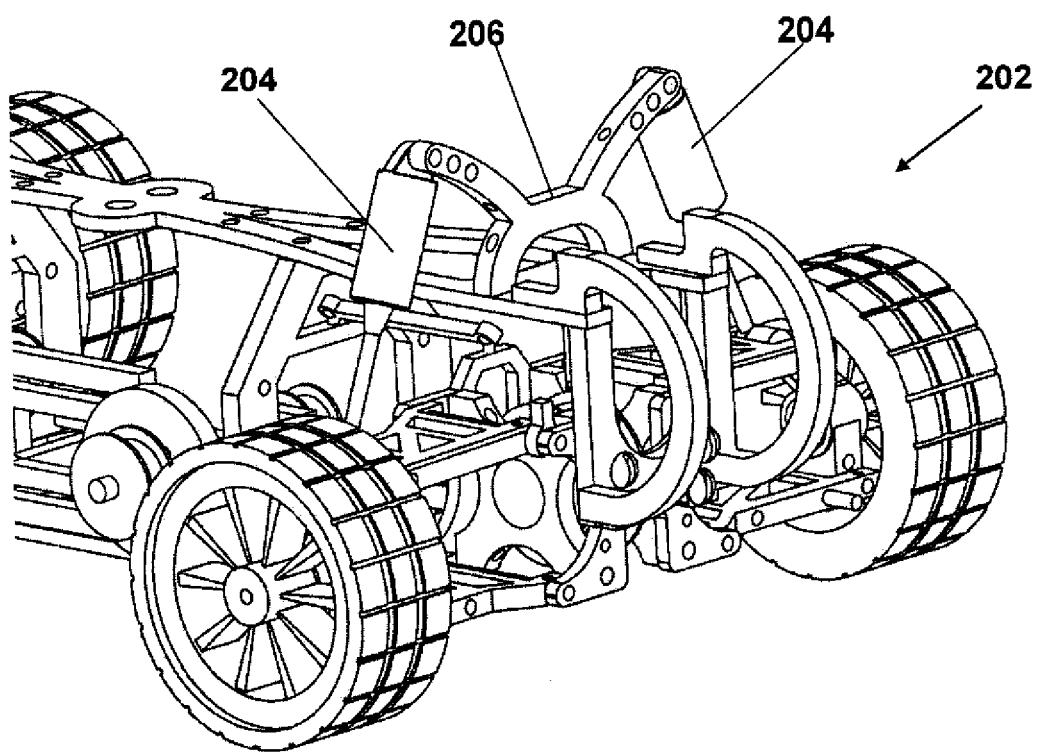
FIG. 8 is a perspective view of the rear of the dual suspension system shown in FIG. 5.
Figure 9:
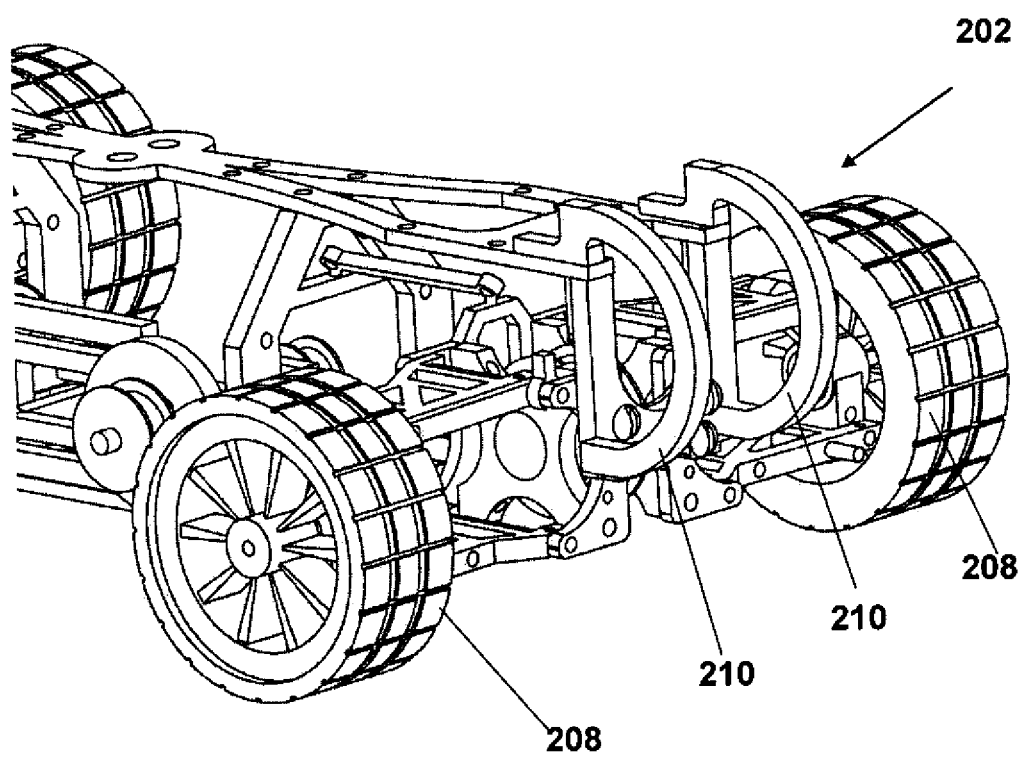
FIG. 9 is a perspective view of the rear of the dual suspension system shown in FIG. 5.
Figure 10:
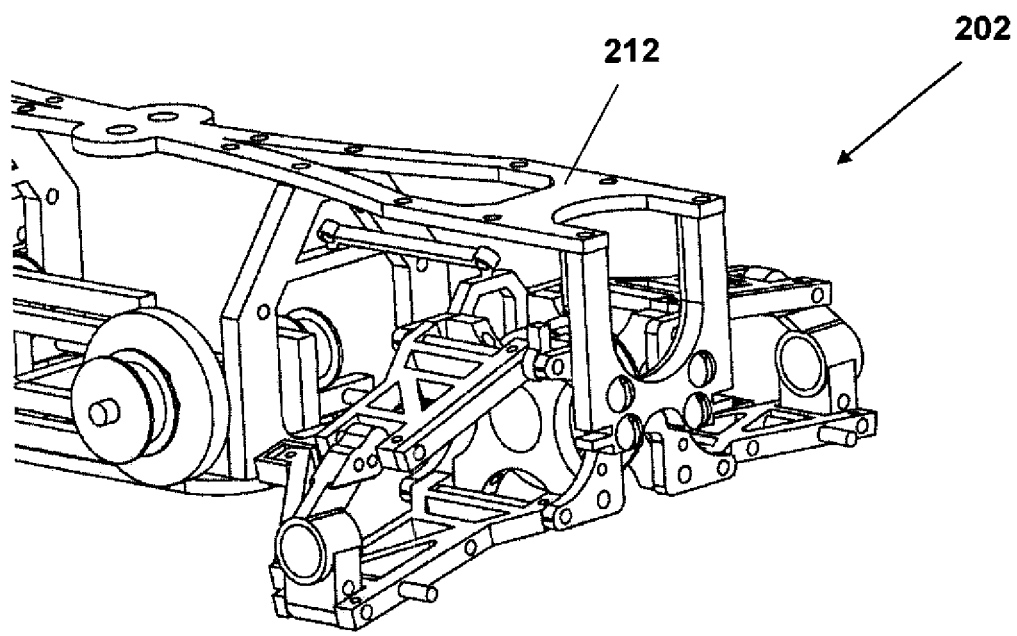
FIG. 10 is a perspective view of the rear of the dual suspension system shown in FIG. 5.

Referring to FIG. 5, an isometric view of an exemplary illustration of a vehicle having a dual suspension system 202 installed both on the front and rear is shown. A top view of the embodiment is shown in FIG. 6, and a front view of the embodiment is shown in FIG. 7. Referring to FIG. 8, an isometric view of a single suspension 202 is shown. Taking away the shocks 204 and shock tower 206 for a better view of the suspension 202 yields FIG. 9. Taking away both wheels 208 and structural members 210 for a better view of the suspension 202 yields FIG. 10. Converting the view of structural member 212 to being translucent for a better view of the suspension 202 yields FIG. 11.

Figure 11:
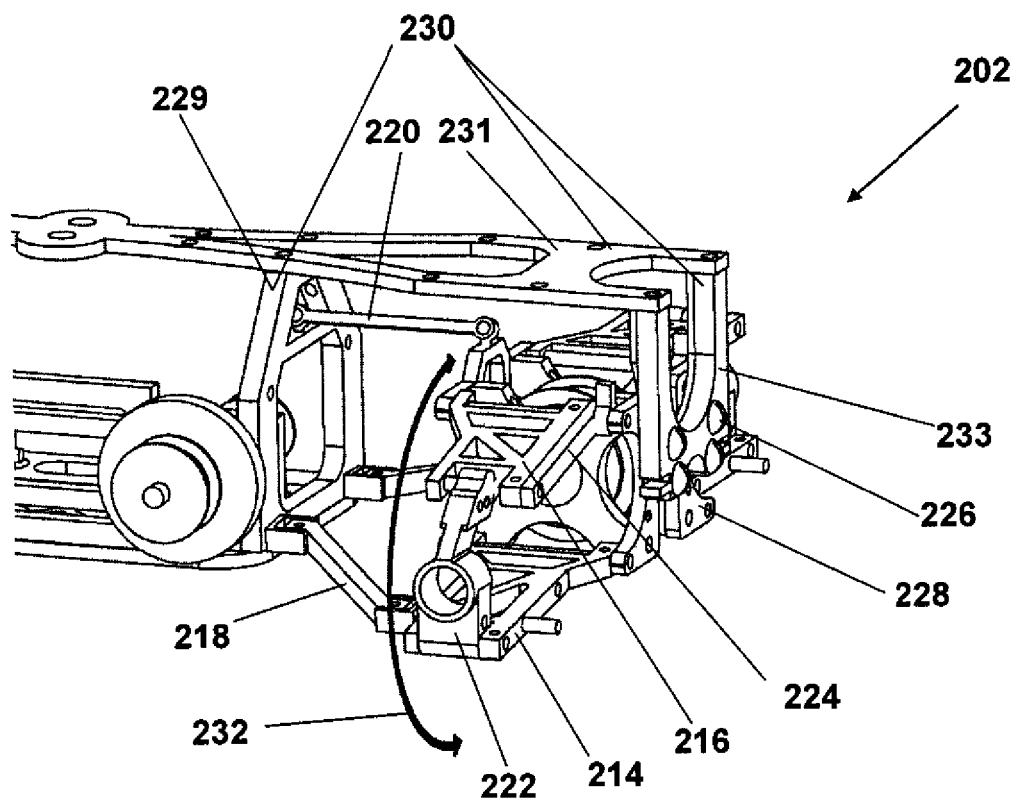
FIG. 11 is a perspective view of the rear of the dual suspension system shown in FIG. 5.
Figure 15:
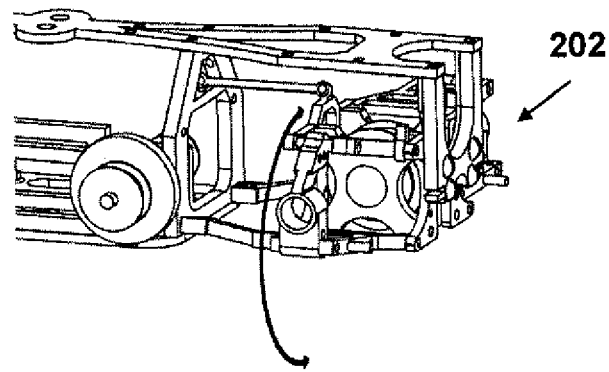
FIGS. 15(*a*), 15(*b*) and 15(*c*) are perspective views of the dual suspension system shown in FIG. 5.
Figure 15:
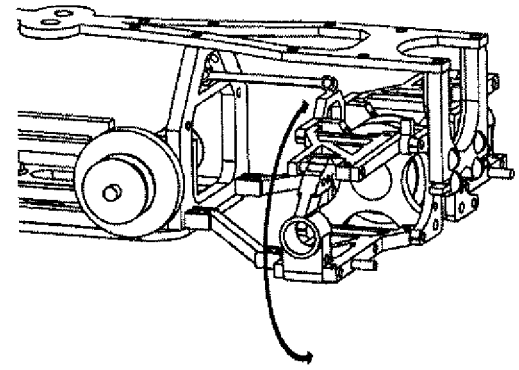
Figure 15:
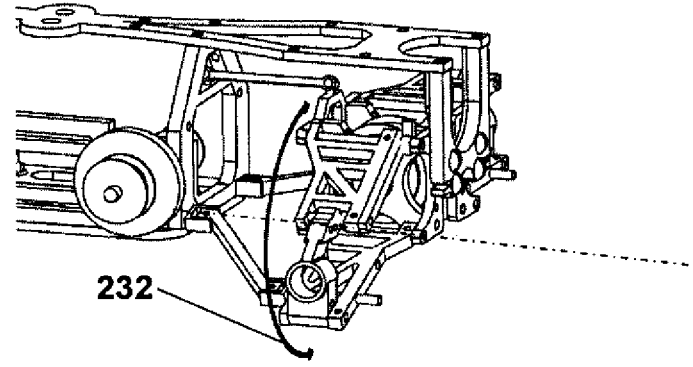

Referring to FIGS. 11 and 15, the suspension 202 is shown in its independent suspension mode of operation. Both the left and right sides of the suspension 202 include the following parts. The lower arm 214 is coupled to a lower portion of the differential housing 228 (shown in further detail in FIG. 12), the angled arm 218 (shown in further detail in FIG. 13), and the hub carrier 222. The upper arm 216 is coupled to an upper portion of the differential housing 228, and the hub carrier 222. The differential housing 228 has upper and lower connection points on both the left and right sides of the differential housing 228. Thus, each of the lower and upper arms 214, 216 on each side of the vehicle is coupled to the differential housing 228. As shown, each of the connection points on the differential housing 228 can be a projection which extends out from the sides of a frame of the differential housing 228. The projection has an opening, and the openings are positioned so that the two openings at the top on the same side of the differential housing 228, face each other. The connections between the differential housing 228 and the lower and upper arms 214, 216 in this embodiment are of a revolute joint type, but can be made with any other type of joint that will accomplish the same effect such as spherical or cylindrical joints.

The lower and upper arms 214, 216 are formed of a bridge truss looking frame design and includes outer beams and inner cross-beams which extend between the outer beams. The actual shape of the arm is not limited to this design and is intended to connect the differential housing 228 with the hub carrier 222. The distal and proximate ends of the outer beams extend substantially parallel to one another. An opening is formed in the distal and proximate ends of the outer beams. The proximate ends of the outer beams are configured to fit just inside the projections of the differential housing 228, so that the openings in the beams are aligned with the openings in the projections. A pin is provided which extends through the respective openings in the beams for each of the arms 214, 216, and the openings in the projections. Accordingly, there are four pins, one for the upper right arm 216, upper left arm 216, lower right arm 214, and lower left arm 214. The pin allows the upper arm 216 and lower arm 214 to freely pivot vertically up and down about the pin, but not horizontally side to side or front to back. In an optimized suspension it would be the object of the engineer to provide a strong enough structure for the lower and upper arms 214, 216, yet at the same time light and dynamically capable enough to provide a functional mechanism that performs the task of a four-bar mechanism.

Figure 13:
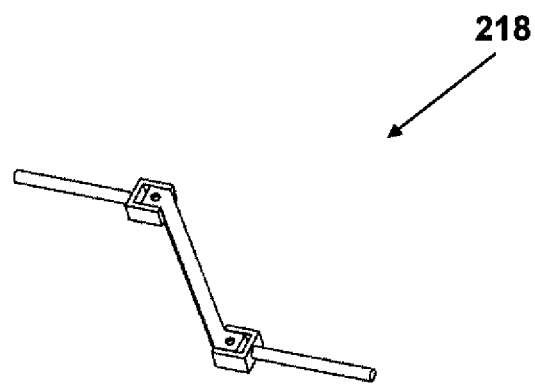
FIG. 13 is a perspective view of an angled arm assembly of the dual suspension system shown in FIG. 5.

The angled arm 218 is coupled to a lower portion of the chassis 230 and the distal end of the lower arm 214. As shown in FIG. 13, the ends of the angled arm 218 are formed as rectangular end pieces which have pins extending outward therefrom. The pins at each end are substantially parallel to one another. The pins extend through openings in the chassis 230 and the two outer beams of the lower arm 214. Thus, the angled arm 218 has a universal joint coupling it to the chassis 230 and the lower arm 214. The angled arm 218 and pins provide support to the distal end of the lower arm 214. The angled arm 218 is meant to rotate along with the lower arm 214 in independent suspension mode and provide suspension for the solid axle in solid axle suspension mode.

The hub carrier 222 is attached to the distal ends of both the lower and upper arms 214, 216. An upper portion of the hub carrier 222 is connected to the distal end of the upper arm 216 by means of a revolute joint or any other joint that will provide the motion required. Thus, an upper hub carrier pin extends through the openings in the upper portion of the hub carrier 222 and the outer beams of the upper arm 216. Likewise, a lower portion of the hub carrier 222 has a lower hub carrier opening which is aligned with openings in the outer beams at the distal end of the lower arm 214, so that the hub carrier 222 is connected to the lower arm 214 by means of a revolute joint or any other joint that will provide the motion required. Thus, the lower hub carrier pin extends through the openings in the lower portion of the hub carrier 222 and the outer beams of the lower arm 214. The upper and lower hub carrier joints cooperate to pivotally couple the hub carrier 222 to the lower and upper arms 214, 216. This permits the vehicle wheel to stay relatively vertically positioned as the lower and upper arms 214, 216 pivot up and down.

Figure 14:
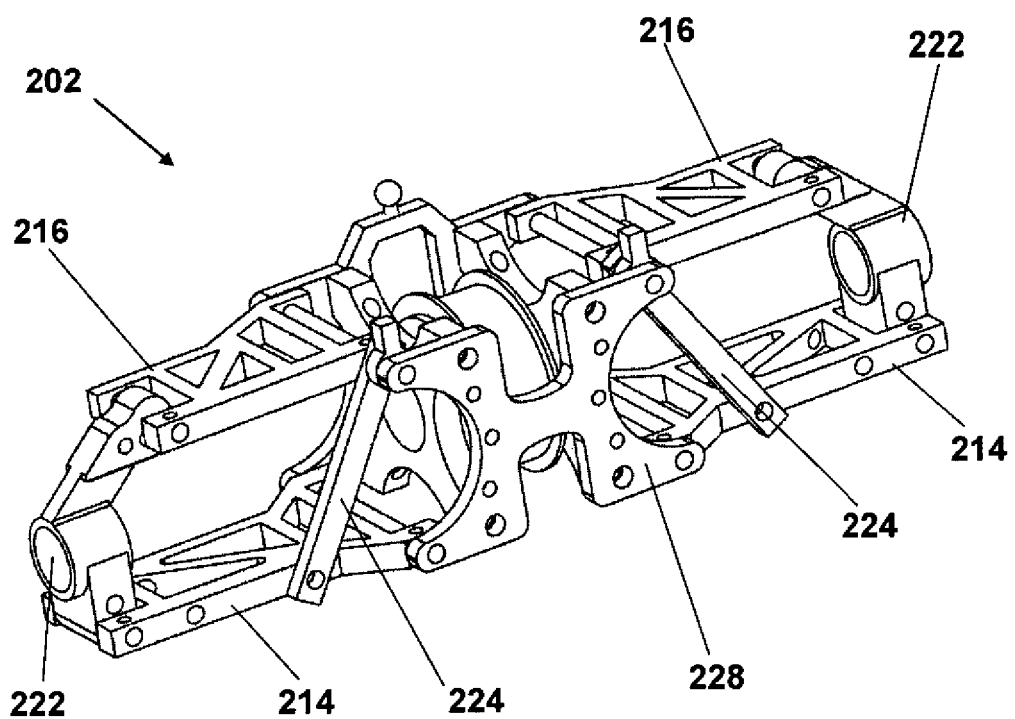
FIG. 14 is a partial perspective view of the dual suspension system shown in FIG. 5.

The center arm 220 is coupled to the differential housing 228 and the chassis 230. A first lock 224 is coupled to the differential housing 228 and the upper arm 216. A second lock 226 is coupled to the differential housing 228 and the chassis 230. The differential housing 228 is coupled to the lower arm 214, the upper arm 216, the center arm 220, the first lock 224, and the second lock 226. The arrow shown by reference 232 is the one degree of freedom for each side of the suspension. In the independent suspension mode of FIGS. 11 and 15, the first lock 224 is unlocked, and the second lock 226 is locked. When engaged, the second lock 226 prevents the center of the suspension (the differential housing 228) from being able to move and so it becomes a part of the chassis 230. The first locks 224, in their unlocked state, permit the lower and upper suspension arms 214, 216 to rotate and so the independent suspension can move about its one degree of freedom 232. Accordingly, the differential housing 228 remains fixed, while the separate lower and upper arm pairs 214, 216 can pivot independent of one another with respect to the differential housing 228. In FIG. 14, the first lock 224 is transferred to its locked position for a better view.

Referring to FIGS. 15(a)-(c), in independent suspension mode, each side of the suspension 202 is free to move along its one degree of freedom 232. The first lock 224 is in its unlocked state on both sides of the suspension 202 and the second lock 226 is in its locked state. FIG. 15 shows one side of the suspension 202 in a few positions of motion. The suspension 202 is up in FIG. 15(a), in a center position in FIG. 15(b) and down in FIG. 15(c). The angled arm 218 and the lower arm 214 are rotating about the same axis shown by a dotted line in FIG. 15(c). In this mode, the differential housing 228 is locked with the second lock 226 to the chassis 230 and therefore the center arm 220 is dormant and does not move. The rocker-rocker/crank-rocker four-bar mechanism consisting of the differential housing 228 as the ground link, the lower arm 214 and the angled arm 218 as one rocker, the hub carrier 222 as the coupler, and the upper arm 216 as the other rocker/crank, is pivoting about its pole center of rotation and therefore has one degree of freedom.

In the embodiment depicted, the chassis 230 includes a center assembly 229 connected to a top outer frame 231, which is coupled to a U-shape end member 233. As shown, the second lock 226 can be one or more bolts which pass through respective openings in the U-shaped end member 233 and are received in respective threaded openings in the differential housing 228. The second lock 226 thereby couples the differential housing 228 to the chassis 230 by mechanically and releasable interlocking couplings (such as, but not limited to, screws, bolts and/or nuts, rivets, and pins), welding, adhesives, or some other mechanical, or electrical coupling or locking mechanism. The second lock 226 needs to be able to be operated between a locked state and an unlocked state. The method of locking is not a limiting factor, and any suitable locking mechanism can be utilized within the scope of the invention.

Figure 16:
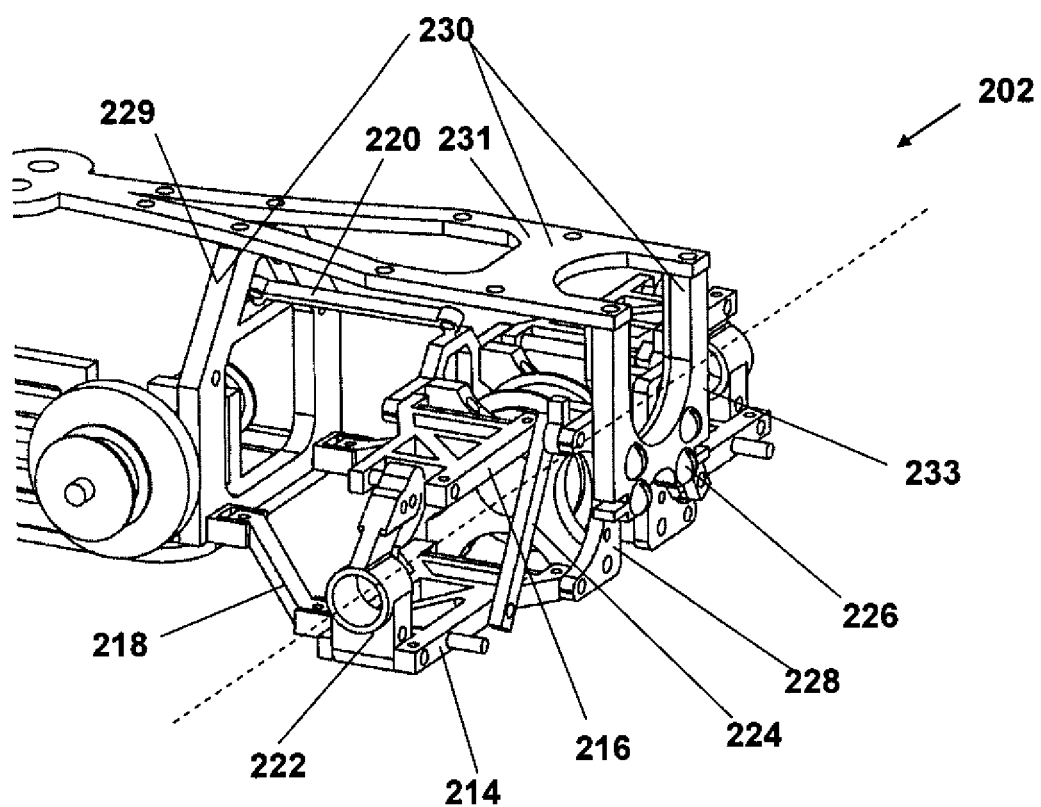
FIG. 16 is a perspective view of the dual suspension system shown in FIG. 5.

Referring to FIG. 16, the suspension 202 is partly transferred to a solid axle suspension mode. Both the left and right sides consist of the following parts. The lower arm 214 is coupled to the differential housing 228, the angled arm 218, and the hub carrier 222. The upper arm 216 is coupled to the differential housing 228, and the hub carrier 222. The angled arm 218 is coupled to a lower portion of the center upright assembly 229 of the chassis 230 and the lower arm 214. The center arm 220 is coupled to the differential housing 228 and a top portion of the center assembly 230 of the chassis 230. The hub carrier 222 is coupled to the distal portions of the lower arm 214 and the upper arm 216. The first lock 224 is coupled to the differential housing 228 and the lower arm 214. The second lock 226 is coupled to the differential housing 228 and the chassis 230. The differential housing 228 is coupled to the lower arm 214, the upper arm 216, the center arm 220, the first lock 224, and the second lock 226.

As further shown, the first lock 224 is in its locked state on both sides of the suspension 202. Thus, the first lock 224 is essentially transforming the two sides into one solid structure, and locking the degree of freedom 232 displayed in FIGS. 11 and 15. This solid structure is one rigid element and is the solid axle holding both the left and right wheels of the suspension. By placing the first locks 224 into the locked state, both left and right sides of the suspension and the center of the suspension (differential housing 228) are fixed on one straight line (illustrated with a dotted line in FIG. 16). The transitional state (between the independent suspension mode of FIGS. 11 and 15 to a solid suspension mode) is shown for the purpose of illustrating the invention. The first lock 224 thereby couples the differential housing 228 to the lower arm 214 by mechanically and releasable interlocking couplings (such as, but not limited to, screws, bolts and/or nuts, rivets, and pins), welding, adhesives, or some other mechanical, or electrical coupling or locking mechanism. The first lock 224 needs to be able to be operated between a locked state and an unlocked state. The method of locking is not a limiting factor, and any suitable locking mechanism can be utilized within the scope of the invention.

It should be apparent that the solid axle suspension mode can include an axle, but that an axle is not necessary. Locking the left and right arms to the suspension center keeps all three parts in a constant position relative to each other. However, the same effect can be reached by locking a lower and upper arm to each other, though this may not be as structurally sound as locking them to the suspension center.

Figure 17:
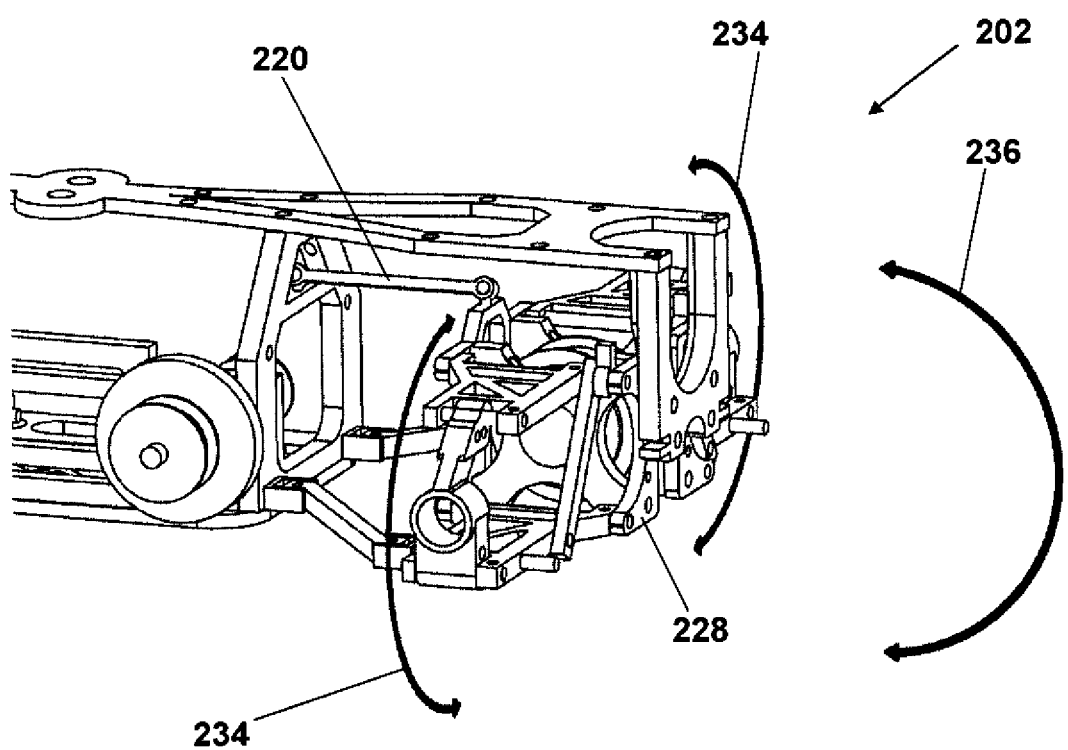
FIG. 17 is a perspective view of the dual suspension system shown in FIG. 5.

Referring to FIG. 17, the second lock 226 is now in its unlocked state and the first lock 224 is locked, so that the suspension 202 is fully transferred to the solid axle mode. By unlocking the second lock 226, the center of the suspension (the differential housing 228) is no longer fixed to the U-shaped end member 233 and therefore is free to move with respect to the chassis 230. The suspension 202 now has two degrees of freedom, as represented by arrows 234 and 236, respectively. The first degree of freedom 234 is a roll about any longitudinal axis of the vehicle. The second degree of freedom 236 is a roll about some lateral axis of the vehicle determined by the mechanism geometry. Depending on the link geometry, the two said axes of rotation can extend as far as infinity.

Figure 12:
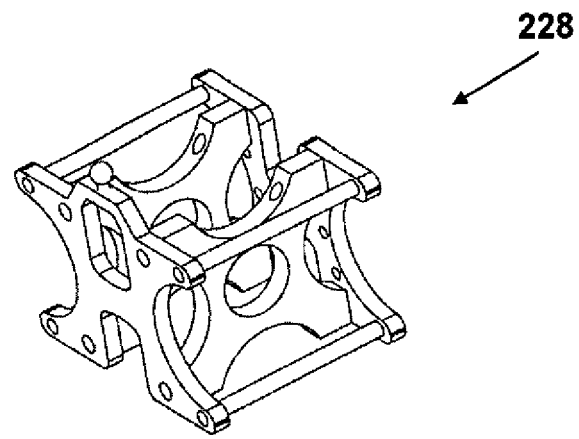
FIG. 12 is a perspective view of a differential housing assembly of the dual suspension system shown in FIG. 5.
Figure 18:
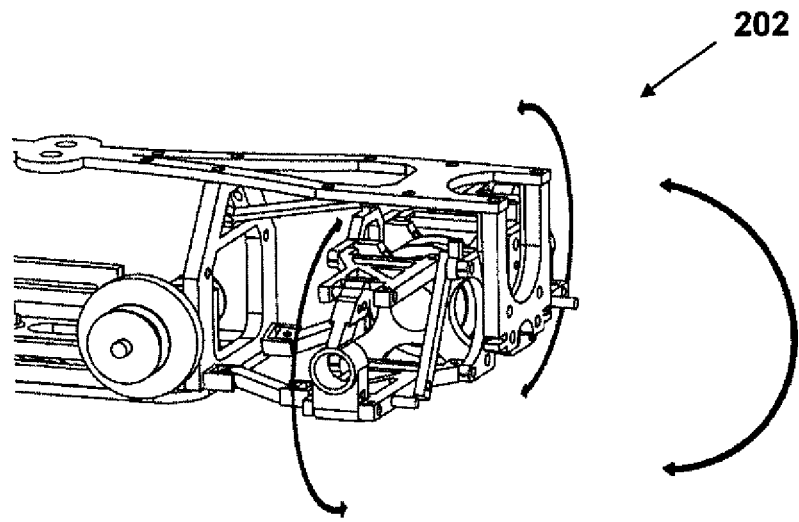
Figure 18:
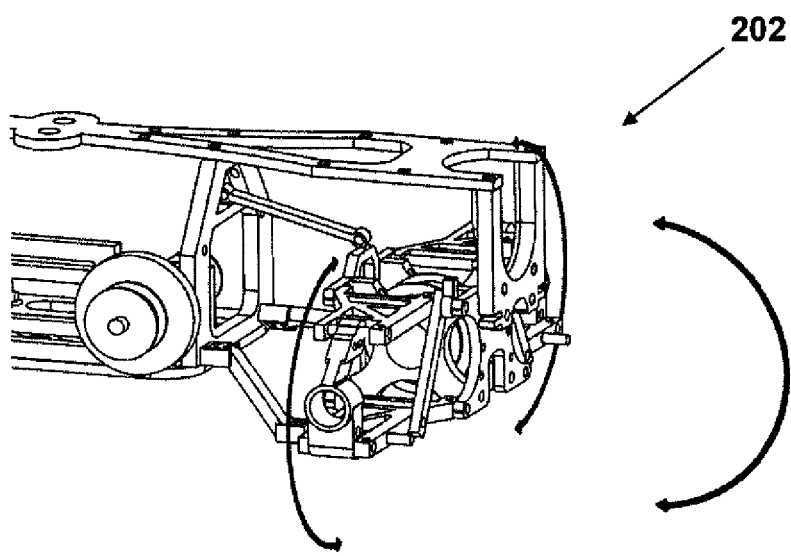

Referring to FIGS. 18(a) and (b), the suspension system 202 is shown in a couple of positions as it is rolling on its lateral degree of freedom 236. In FIG. 18(a), the suspension 202 is raised with respect to the chassis 230, and in FIG. 18(b), the suspension 202 is lowered with respect to the chassis 230. The suspension 202 is moving as one solid unit just like a solid axle. Notice the position of the center arm 220 and the two angled arms 218 in comparison to FIG. 17. The center arm 220 comprises an elongated arm having coupling members at each end. As best shown in FIG. 12, a ball-connector is provided at the top of the differential housing 228, and a similar ball-connector is provided at the center assembly 229. The coupling members of the center arm 220 are pivotally coupled with the ball-connectors of the center assembly 229 and the differential housing 228. In the independent suspension mode of FIGS. 11 and 15, the center arm 220 does not pivot since the differential housing 228 does not move with respect to the chassis 230. However, in the solid axle suspension mode of FIG. 18, the center arm 220 pivots as the differential housing 228 moves with respect to the chassis 230. The center arm 220 provides the upper support for the suspension 202 when it is in solid axle mode whereas the two diagonal arms 218 provide the lower support for the suspension when it is in solid axle mode. The diagonal arms 218 and the center arm 220 form one specific spatial mechanism that can be replaced with any other kind of mechanism that will perform a similar task such as trailing arms, four bar mechanism and so on. The joints connecting the arms may or may not employ spherical joints or revolute joints or universal joints. The solid axle suspension mode is not limited to one type of setup.

Figure 19:
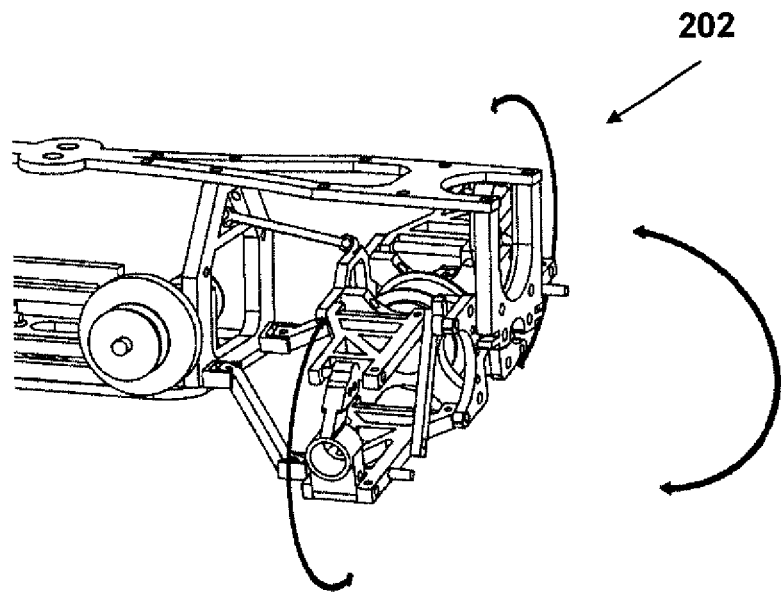
FIGS. 19(*a*) and 19(*b*) are perspective views of the dual suspension system shown in FIG. 5.
Figure 19:
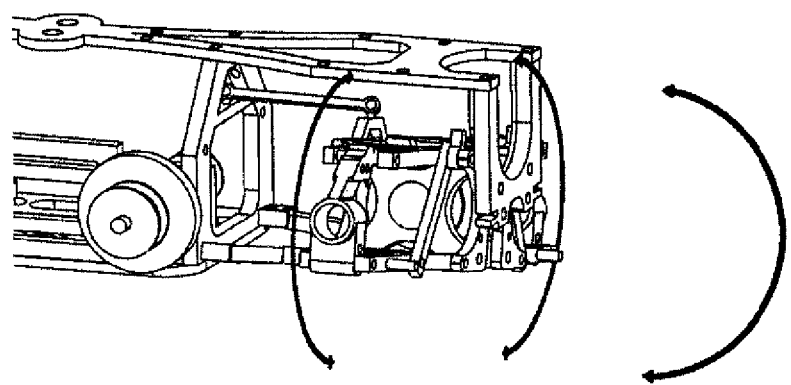
Figure 20:
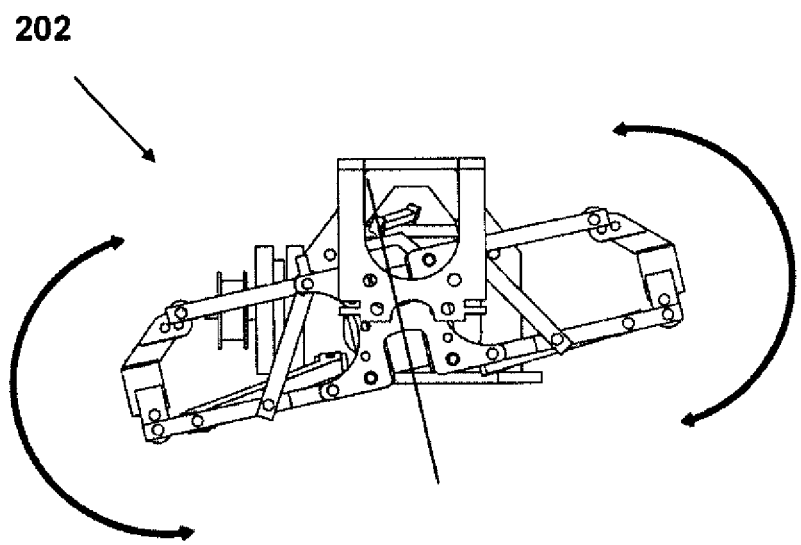
FIGS. 20(*a*) and 20(*b*) are perspective views of the dual suspension system shown in FIG. 5.
Figure 20:
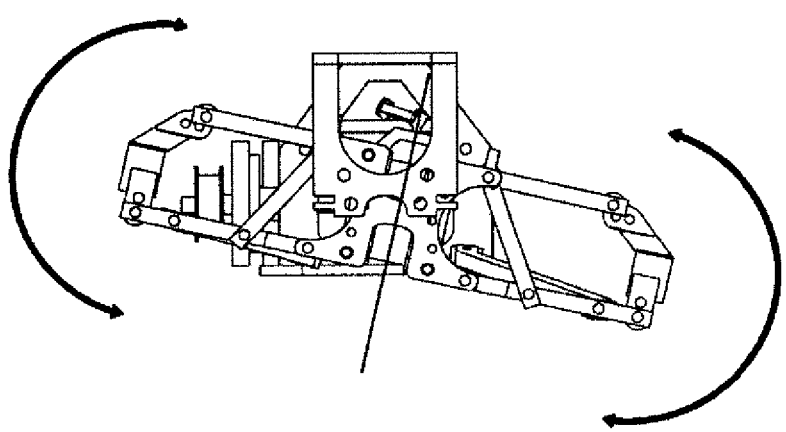

Referring to FIGS. 19-20, the suspension 202, in the solid axle mode, is shown in a couple of locations as it is rolling on its longitudinal degree of freedom 234. Notice the position of the center arm 220 and the two angled arms 218 in comparison to FIG. 17. The suspension 202 is moving as one solid unit just like a solid axle. FIG. 19 shows an isometric view of the suspension 202 and FIG. 20 shows a front view of the suspension 202. The angled arms 218 and the center arm 220 are constructed in such a way that permits the solid axle suspension to rotate both on a longitudinal degree of freedom 234 and a lateral degree of freedom 236. A rotation of the arms on both degrees of freedom 234, 236 at the same time creates a spatial mechanism and allows the vehicle to have that desirable articulation benefit of a solid axle suspension.

Figure 21:
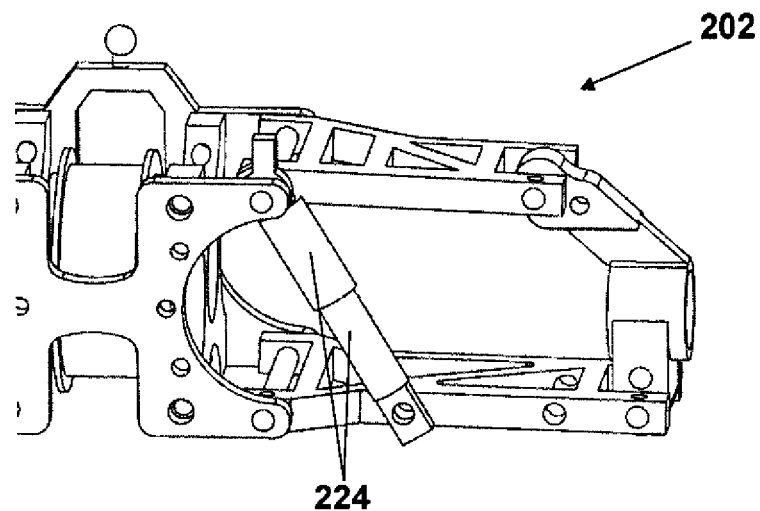
FIG. 21 is a partial perspective view of yet another exemplary embodiment of a dual suspension system.
Figure 22:
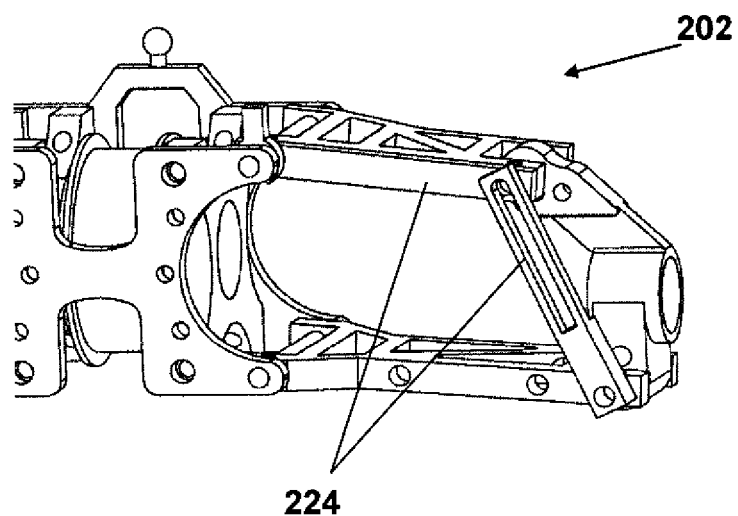
FIG. 22 is a partial perspective view of yet another exemplary embodiment of a dual suspension system.

Referring to FIGS. 21-22, the first lock 224 can operate in various ways. It is not limited to a single design, but only to the locked and unlocked states. In FIGS. 5-20, the lock 224 comprises a solid rectangular bar having an opening in each end. One end of the bar is coupled to the upper portion of the differential housing via a revolute joint. More specifically, the pin which extends through the openings in the upper arm 216, also extends through an opening in the rectangular bar and passes into the opening in the differential housing 228. Thus, the locking bar 224 is positioned between the projection of the differential housing 228 and the outer frame of the upper arm 216. The opposite end of the bar is movable from an unlocked position, in which the bar is positioned along the upper arm 216 (as shown in FIG. 11), to a locked position, in which the bar is locked to the lower arm 214 (as shown in FIG. 14). A pin or fastener extends through the opening at the opposite end of the bar and into an opening in the outer beam of the lower arm 214. The opposite end of the bar is coupled to the lower arm 214 at a distance away from the differential housing 228. The lock 224 thus prevents the upper and lower arms 216,214 from moving up and/or down with respect to the differential housing 228 by creating a truss structure.

Alternative embodiments of the first lock 224 are shown in FIGS. 21-22. In FIG. 21, the first lock 224 is a telescopic arm that can either be free to move or locked in place. The locking can be made possible with air pressure, oil pressure, electrical component (such as a solenoid), combinations of the aforementioned, or some other electrical, mechanical, or electromechanical method of fixing one mechanical component relative to another mechanical component. FIG. 22 shows another method for a first lock mechanism. In this case, a slider mechanism can transfer from an unlocked state to a locked state and back to an unlocked state.

An illustrative embodiment of the invention is a Mercedes G-500, which has solid axle suspension for its front and rear wheels and has widely known outstanding off-road capabilities. The exemplary vehicle has four wheels and generally similar maneuverability and dynamic characteristics of known automobiles. The exemplary vehicle had two differentials, a first differential for the front set of wheels and a second differential for the rear set of wheels. The drive system is a "Nitro 4-tech 2.5" manufactured by Traxxas. The Nitro 4-tech 2.5 includes two steel planetary differentials, two rubber timing belts, universal joint telescoping drive shafts, and a complete ball bearing set. The exemplary vehicle has a chassis made from steel.

Figure 23:
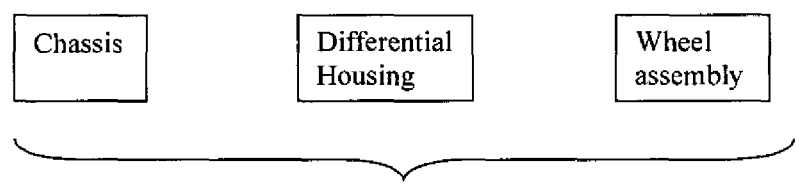
FIGS. 23-28 are block diagrams showing the major components of the dual suspension system.
Figure 24:
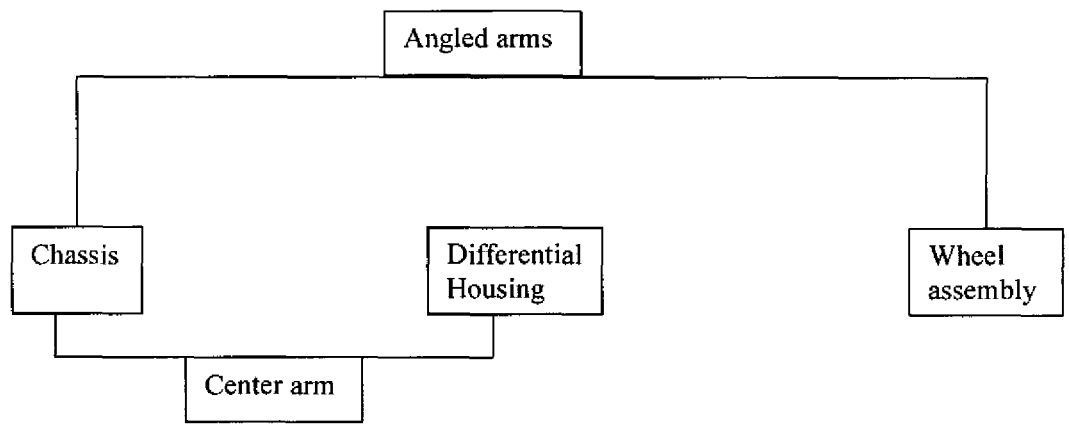
Figure 25:
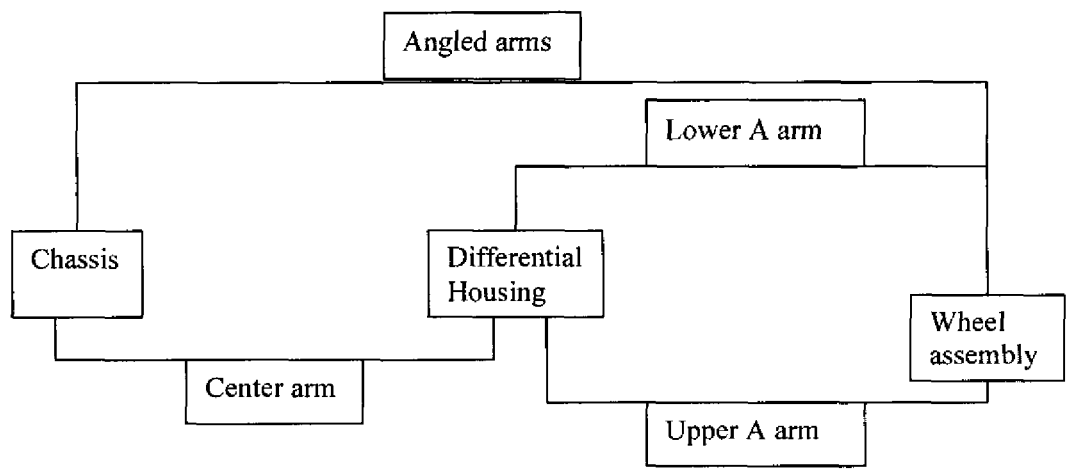
Figure 26:
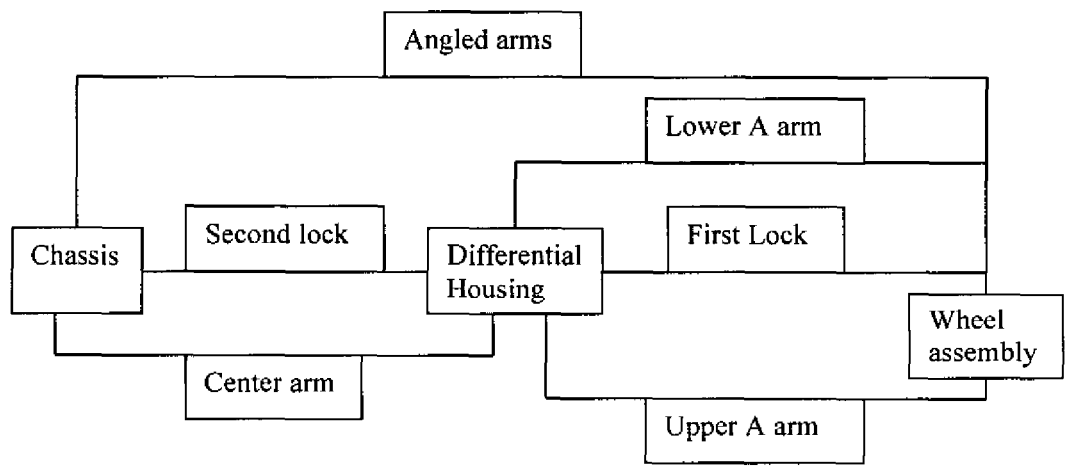
Figure 27:
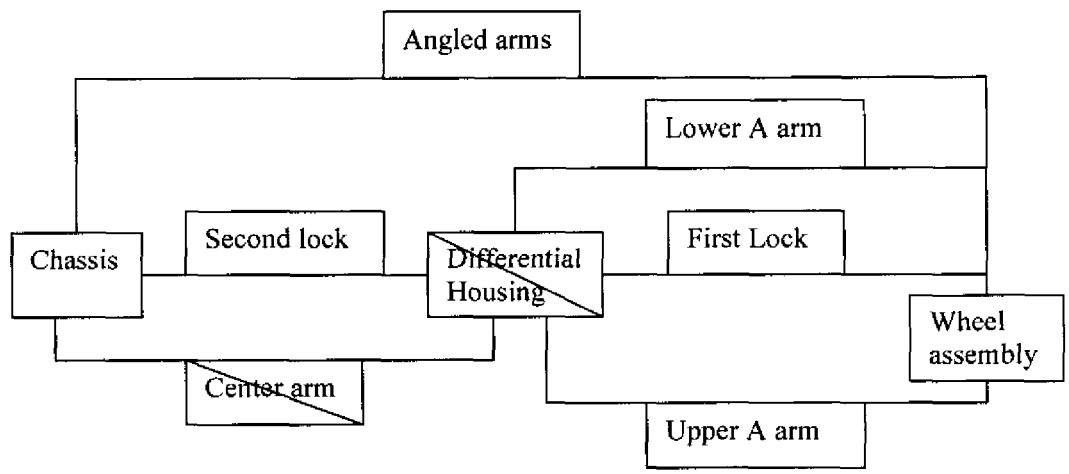
Figure 28:
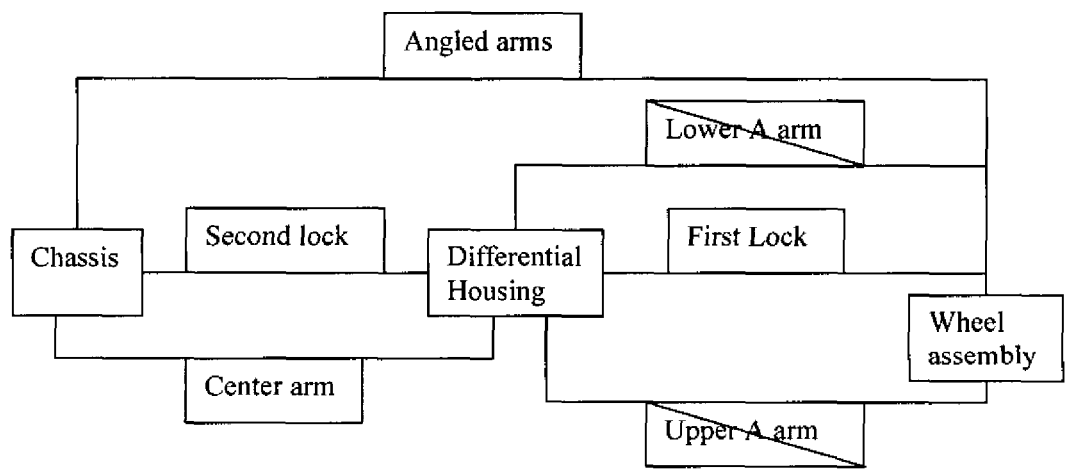

Referring to FIGS. 23-28, the dual suspension system is made of many components but has three major parts: the chassis, the center of the suspension (i.e., the differential housing), and the wheel assemblies on each side of the vehicle (wheels, hubs, and hub carriers), as shown in FIG. 23. There are two sets of links connecting them all and two sets of locks fixing and releasing the degrees of freedom allowed by the connecting links. The chassis is linked to the differential housing by the center arm and linked to the wheel assembly with the angled arms, as shown in FIG. 24. In addition, the differential housing is linked to the wheel assembly with the upper and lower A arms, as shown in FIG. 25. Both sets of links are controlled by the first and second locks shown in FIG. 26. When the first lock is unlocked and the second lock is locked, the differential housing becomes a fixed part of the chassis, the center arm is dormant and the angled arm, the upper A arm and lower A arm are free to move. In this state, the suspension is in the independent suspension mode shown in FIG. 27. When the first lock is locked and the second lock is unlocked, both of the upper and lower A arms are fixed in a position that keeps them in a straight line with the differential housing, and the differential housing is now free to move. Both angled arms and the center arm are also free to move. In this state, the suspension is in the solid axle mode, as shown in FIG. 28. In both the independent suspension mode and the solid axle mode, the chassis is considered to be the ground, and the wheel assembly is permitted motion relative to the chassis. The different usage of links and locks provide different dynamic characteristics. By switching from one mode to the other, a driver is able to take advantage of the benefits of each type of suspension as deemed appropriate for the given driving terrain and conditions.

The dual suspension system allows a driver to choose between a solid axle suspension mode or an independent suspension mode at will. While in solid axle suspension mode, the driver can rely on: very strong suspension geometry for industrial use; camber control during cornering; two degrees of freedom for each wheel; one on a longitudinal axis of the vehicle and the other on a lateral axis of the vehicle. The solid axle suspension mode also has the advantage that forces and displacements are transferred from one wheel to the other because of the solid connection between them and therefore the wheels are "aware" of one another and provide the vehicle with excellent ground articulation capabilities and the vehicle can tackle very large obstacles.

While in independent suspension mode, the driver can rely on: A very light and agile suspension that is very responsive to changes in terrain; a suspension that is very adjustable as far as camber, camber gain, caster, toe-in/out, and positioning of roll center; a very good lateral control; and an independence of each wheel from the other. The independent suspension will react quickly to a bump in the road and quickly recover, which at high speed will keep the wheels of the vehicle on the ground and not constantly spinning in the air (energy is not wasted). The chassis will remain fairly parallel to the ground and ride quality will be gained. With the right adjustments, cornering will be improved, and so the overall high speed performance will be enhanced in comparison to the solid axle.

While a particular embodiment has been chosen to illustrate the invention, it will be understood by those skilled in the art that various changes and modifications can be made therein without departing from the scope of the invention as defined in the appended claims.

For instance, though the specific connections between the differential housing 228, arms 214, 216 and angled arm 218 have been described, it should be readily apparent that other forms of mechanical connection can be utilized within the spirit and scope of the invention. In addition, it should be appreciated that the first and second locks 224, 226 can be switched between a locked mode and an unlocked mode, either manually or automatically with electronic controls such as solenoids or hydraulics. For instance, the locks 224, 226 can be engaged simultaneously or separately. In addition, the first and second locks 224, 226 need not be separate locking mechanisms, but can be combined into a single lock. Still further, each lock 224, 226 has separate utility and the locks 224, 226 need not be provided together. Thus, the invention is not intended to be limited to the specific embodiments discussed herein.

What is claimed is:

1. A dual mode suspension system for a vehicle, comprising:
 a chassis;
 a suspension support; and,
 a suspension directly or indirectly coupled with said chassis and said suspension support, said suspension having an independent suspension mode and a solid axle suspension mode.

2. The dual mode suspension system of claim 1, said suspension having an upper suspension arm and a lower suspension arm, each coupled to the suspension support.

3. The dual mode suspension system of claim 1, wherein said chassis comprises a body.

4. The dual mode suspension system of claim 1, further comprising a lock operatively coupling the suspension support to the chassis to provide at least a partial switch between the independent suspension mode and the solid axle suspension mode.

5. The dual mode suspension system of claim 1, further comprising a differential in the suspension support.

6. A dual mode suspension system for a vehicle, comprising:
   a chassis;
   a suspension support directly or indirectly coupled with said chassis;
   a suspension having an upper suspension arm and a lower suspension arm, each coupled to the suspension support; and
   a lock operatively coupling either of the upper suspension arm or the lower suspension arm to the suspension support to position the suspension between an independent suspension mode and a solid axle suspension mode.

7. The dual mode suspension system according to claim 6, the suspension support being directly coupled to the chassis in the independent suspension mode and not directly coupled with the chassis in the solid axle suspension mode.

8. The dual mode suspension system according to claim 7, wherein the lock comprises a first lock operatively coupling either the upper suspension arm or the lower suspension arm to the suspension support, and a second lock operatively coupling the suspension support to the chassis.

9. A dual mode suspension system for a vehicle, comprising:
   a chassis;
   a suspension support;
   a first suspension positioned at a right side of the vehicle, the first suspension having a first upper suspension arm and a first lower suspension arm, each of the first upper suspension arm and the first lower suspension arm coupled to the suspension support;
   a second suspension positioned at a left side of the vehicle and aligned with the first suspension, said second suspension having a second upper suspension arm and a second lower suspension arm, each of the second upper suspension arm and the second lower suspension arm coupled to the suspension support;
   a first lock coupling either the first upper suspension arm or the first lower suspension arm to the suspension support and either the second upper suspension arm or the second lower suspension arm to the suspension support in a solid axle suspension mode, and not directly coupling the first and second upper and lower suspension arms with the chassis in an independent suspension mode; and
   a second lock coupling the suspension support to the chassis in the independent suspension mode and not directly coupling the suspension support with the chassis in the solid axle suspension mode.

10. A method for providing a dual mode suspension system for a vehicle, the method comprising:
    providing a chassis;
    providing a suspension support; and,
    providing a suspension directly or indirectly coupled with said chassis and said suspension support, said suspension having an independent suspension mode and a solid axle suspension mode.

11. The method of claim 10, said suspension having an upper suspension arm and a lower suspension arm, each coupled to the suspension support.

12. The method of claim 10, wherein said chassis comprises a body.

13. The method of claim 10, further comprising operatively coupling the suspension support to the chassis to provide at least a partial switch between the independent suspension mode and the solid axle suspension mode.

14. The method of claim 10, further comprising providing a differential in the suspension support.

15. A method for providing dual mode suspension system for a vehicle, the method comprising:
    providing a chassis;
    providing a suspension support;
    providing a first suspension positioned at a right side of the vehicle, the first suspension having a first upper suspension arm and a first lower suspension arm, each of the first upper suspension arm and the first lower suspension arm coupled to the suspension support;
    providing a second suspension positioned at a left side of the vehicle and aligned with the first suspension, said second suspension having a second upper suspension arm and a second lower suspension arm, each of the second upper suspension arm and the second lower suspension arm coupled to the suspension support;
    coupling, using a first lock, either the first upper suspension arm or the first lower suspension arm to the suspension support and either the second upper suspension arm or the second lower suspension arm to the suspension support in a solid axle suspension mode, and not directly coupling the first and second upper and lower suspension arms with the chassis in an independent suspension mode; and
    coupling, using a second lock, the suspension support to the chassis in the independent suspension mode and not directly coupling the suspension support with the chassis in the solid axle suspension mode.

* * * * *